US012755656B2

(12) United States Patent
Zhang

(10) Patent No.: US 12,755,656 B2
(45) Date of Patent: Oct. 6, 2026

(54) DISPLAY APPARATUS AND EXTENDED REALITY DEVICE

(71) Applicant: Beijing Zitiao Network Technology Co., Ltd., Beijing (CN)

(72) Inventor: Jihe Zhang, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 0 days.

(21) Appl. No.: 18/862,334

(22) PCT Filed: Sep. 5, 2023

(86) PCT No.: PCT/CN2023/117039

§ 371 (c)(1),
(2) Date: Nov. 1, 2024

(87) PCT Pub. No.: WO2024/051694

PCT Pub. Date: Mar. 14, 2024

(65) Prior Publication Data

US 2025/0292710 A1 Sep. 18, 2025

(30) Foreign Application Priority Data

Sep. 8, 2022 (CN) ......................... 202211097088.4
Sep. 8, 2022 (CN) ......................... 202211097106.9

(51) Int. Cl.
*G09G 3/00* (2006.01)

(52) U.S. Cl.
CPC ..... *G09G 3/001* (2013.01); *G09G 2310/0297* (2013.01)

(58) Field of Classification Search
CPC ........... G09G 3/001; G09G 2310/0297; H05K 2201/10128; H05K 1/189; G02B 27/0101
See application file for complete search history.

(56) References Cited

U.S. PATENT DOCUMENTS 10,565,941 B1 2/2020 Richards et al.
2012/0133732 A1 5/2012 Li et al.
(Continued)

FOREIGN PATENT DOCUMENTS

CN 203104954 U 7/2013
CN 103491705 A 1/2014
(Continued)

OTHER PUBLICATIONS

Office action received from Chinese patent application No. 202211097088.4 mailed on Jun. 19, 2025, 18 pages (10 pages English Translation and 8 pages Original Copy).
(Continued)

*Primary Examiner* — Ricardo Osorio

(57) ABSTRACT

The present disclosure relates to a display apparatus and an extended reality device. The display apparatus comprises: a first display module, a second display module and a first flexible circuit board. The first display module comprises a first substrate, N first signal lines and a multiplexer being arranged on the first substrate, a first connection end of the first flexible circuit board being fixed on the first substrate, and the multiplexer being electrically connected between the first connection end of the first flexible circuit board and the first signal lines. The second display module comprises a second substrate, N second signal lines and a first demultiplexer being arranged on the second substrate, a second connection end of the first flexible circuit board being fixed to the second substrate, and the first demultiplexer being electrically connected between the second connection end of the first flexible circuit board and the second signal lines. The number of electrical connection lines in the first flexible circuit board is M, M being less than N, and M and N being both positive integers.

19 Claims, 5 Drawing Sheets

(56) References Cited

U.S. PATENT DOCUMENTS

| | | | | |
|---|---|---|---|---|
| 2014/0049449 | A1 | 2/2014 | Park et al. | |
| 2014/0146491 | A1 | 5/2014 | Chan et al. | |
| 2014/0192174 | A1 | 7/2014 | Park et al. | |
| 2016/0267713 | A1 | 9/2016 | Patel | |
| 2016/0269720 | A1* | 9/2016 | Patel | H04N 13/344 |
| 2017/0084867 | A1 | 3/2017 | Lim et al. | |
| 2017/0188469 | A1 | 6/2017 | Taguchi | |
| 2018/0204532 | A1 | 7/2018 | Kobayashi et al. | |
| 2019/0005884 | A1* | 1/2019 | Yoo | G09G 3/3266 |
| 2019/0130838 | A1 | 5/2019 | Miyasaka et al. | |
| 2019/0254163 | A1 | 8/2019 | Sugiyama et al. | |
| 2020/0051495 | A1* | 2/2020 | Nakatogawa | G09G 3/3208 |
| 2021/0091334 | A1 | 3/2021 | Heo et al. | |
| 2021/0141930 | A1 | 5/2021 | Aziz et al. | |
| 2021/0325707 | A1 | 10/2021 | Nie | |
| 2022/0199031 | A1 | 6/2022 | Jo et al. | |
| 2024/0027812 | A1* | 1/2024 | Zhao | G02F 1/13336 |
| 2024/0036374 | A1* | 2/2024 | Xiao | G02F 1/133388 |

FOREIGN PATENT DOCUMENTS

| | | | | |
|---|---|---|---|---|
| CN | 103617518 | A | 3/2014 | |
| CN | 206210290 | U | 5/2017 | |
| CN | 107039595 | A | 8/2017 | |
| CN | 206452598 | U | 8/2017 | |
| CN | 107832941 | A | 3/2018 | |
| CN | 109067896 | A | 12/2018 | |
| CN | 109407434 | A | 3/2019 | |
| CN | 110167253 | A | 8/2019 | |
| CN | 110266507 | A | 9/2019 | |
| CN | 110875927 | A | 3/2020 | |
| CN | 210432032 | U | 4/2020 | |
| CN | 111181832 | A | 5/2020 | |
| CN | 111340402 | A | 6/2020 | |
| CN | 111401844 | A | 7/2020 | |
| CN | 211349321 | U | 8/2020 | |
| CN | 212391687 | U | 1/2021 | |
| CN | 110047427 | B | 3/2021 | |
| CN | 112506661 | A | 3/2021 | |
| CN | 112542556 | A | 3/2021 | |
| CN | 112819574 | A | 5/2021 | |
| CN | 113093390 | A | 7/2021 | |
| CN | 113140161 | A | 7/2021 | |
| CN | 113592414 | A | 11/2021 | |
| CN | 113660206 | A | 11/2021 | |
| CN | 113886212 | A | 1/2022 | |
| CN | 114022119 | A | 2/2022 | |
| CN | 114245568 | A | 3/2022 | |
| CN | 114283755 | A | 4/2022 | |
| CN | 114385898 | A | 4/2022 | |
| CN | 114664261 | A | 6/2022 | |
| CN | 115099777 | A | 9/2022 | |
| CN | 115134104 | A | 9/2022 | |
| DE | 102017129795 | B4 * | 8/2024 | G06F 3/011 |
| JP | 2017118042 | A * | 6/2017 | H05K 3/284 |
| KR | 2016-0112570 | A | 9/2016 | |
| TW | M545269 | U * | 7/2017 | |

OTHER PUBLICATIONS

Office action received from Chinese patent application No. 202211097106.9 mailed on Jul. 16, 2025, 20 pages (10 pages English Translation and 10 pages Original Copy).

Office action received from Chinese patent application No. 202211097088.4 mailed on Jan. 15, 2026, 16 pages (8 pages English Translation and 8 pages Original Copy).

Office action received from Chinese patent application No. 202211097106.9 mailed on Jan. 17, 2026, 20 pages (10 pages English Translation and 10 pages Original Copy).

International Search Report and Written Opinion received for PCT Patent Application No. PCT/CN2023/098258, mailed on Aug. 22, 2023, 14 pages (7 pages of English Translation and 7 pages of Original Document).

International Search Report and Written Opinion received for PCT Patent Application No. PCT/CN2023/117039, mailed on Nov. 18, 2023, 11 pages (5 pages of English Translation and 6 pages of Original Document).

Notice of Registration Procedures received from Chinese patent application No. 202210720206.6 mailed on May 31, 2024, 8 pages (4 pages English Translation and 4 pages Original Copy).

Office action received from Chinese patent application No. 202210720206.6 mailed on Mar. 30, 2024, 14 pages (7 pages English Translation and 7 pages Original Copy).

Office action received for Chinese patent application No. 202211097088.4 mailed on Jul. 16, 2026, 22 pages (11 pages English Translation and 11 pages Original document).

European Search Report for EP Patent Application No. 23862388.8, Issued on May 27, 2026, 18 pages.

* cited by examiner

DISPLAY APPARATUS AND EXTENDED REALITY DEVICE

CROSS REFERENCE TO RELATED APPLICATIONS

This application is a national stage of International Application No. PCT/CN2023/117039 filed on Sep. 5, 2023, which is based on and claims priority to Chinese Patent Application Nos. 202211097088.4 filed on Sep. 8, 2022, and 202211097106.9 filed on Sep. 8, 2022, which are incorporated herein by reference in their entireties.

TECHNICAL FIELD

The present disclosure relates to the field of display technologies, and in particular, to a display apparatus and an extended reality device.

BACKGROUND

An extended reality (XR for short) refers to creating a human-machine interactive virtual environment by combining the real world with the virtual world through a computer, which is also a general term for a variety of technologies such as augmented reality (AR), virtual reality (VR), and mixed reality (MR). By integrating visual interaction technologies of the three, an "immersive feeling" of seamless switching between the virtual world and the real world is brought to an experiencer.

SUMMARY

According to a first aspect, the present disclosure provides a display apparatus, including:

- a first display module, where the first display module includes a first substrate, N first signal lines and a multiplexer are arranged on the first substrate;
- a second display module, where the second display module includes a second substrate, N second signal lines and a first demultiplexer are arranged on the second substrate; and
- a first flexible circuit board, where a first connection end of the first flexible circuit board is fixed to the first substrate, the multiplexer is electrically connected between the first connection end of the first flexible circuit board and the first signal lines, a second connection end of the first flexible circuit board is fixed to the second substrate, and the first demultiplexer is electrically connected between the second connection end of the first flexible circuit board and the second signal lines,
- wherein a number of electrical connection lines in the first flexible circuit board is M, M is less than N, and both M and N are positive integers.

According to a second aspect, the present disclosure further provides an extended reality device, including the display apparatus described above.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

In order to more clearly illustrate the technical solutions in the embodiments of the present disclosure or in the related art, the following briefly describes the accompanying drawings required for describing the embodiments or the related art. Apparently, those skilled in the art can derive other drawings from these accompanying drawings without creative efforts.

DETAILED DESCRIPTION OF EMBODIMENTS

Figure 1:
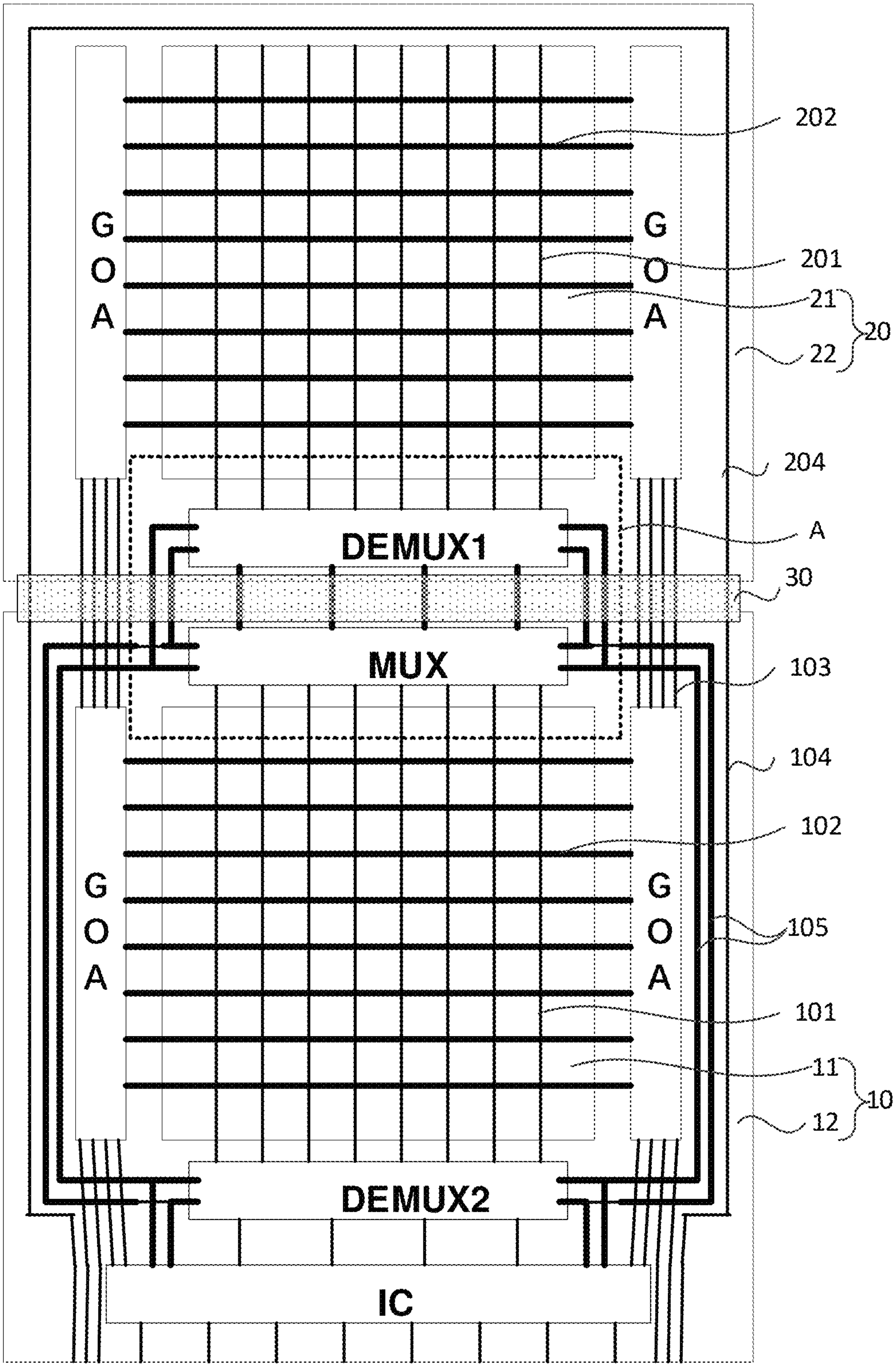
FIG. 1 is a schematic diagram of a structure of a display apparatus according to an embodiment of the present disclosure.

In order to more clearly understand the above objectives, features, and advantages of the present disclosure, the solutions of the present disclosure are described further below. It should be noted that, in case if there is no conflict, embodiments of the present disclosure and features in the embodiments may be combined with each other.

A large number of specific details are set forth in the following description to fully understand the present disclosure, but the present disclosure may also be implemented in other manners different from those described herein; apparently, the embodiments in the description are merely some rather than all of the embodiments of the present disclosure.

A conventional head-mounted extended reality device is designed to include only one display screen, with a black matrix arranged in the middle of the display screen to divide the display screen into two display regions, that is, a left-eye display region and a right-eye display region. To adjust an interpupillary distance (IPD) for this kind of head-mounted virtual reality devices, a lateral distance between the display regions needs to be increased, and a size of the display screen needs to be increased, which may result in an increase in power consumption of the display apparatus, an increase in a size of the display apparatus, and an increase in a cost of the display apparatus. If separate display screens are respectively provided for the left eye and the right eye, and the two display screens are electrically connected through a flexible circuit board, when the display screens have a high pixels per inch (PPI) and a high resolution, the two display screens need a large number of connection pins to be connected. To form the large number of connection pins in a limited space, a size of the connection pins needs to be reduced. However, if the size of the connection pins is too small, the flexible circuit board can not be produced, or a bonding yield of flexible circuit board may be reduced.

To solve the above technical problems or at least partially solve the above technical problems, the present disclosure provides a display apparatus and an extended reality device.

The technical solution provided in this embodiment of the present disclosure has the following advantages over the prior art:

According to the technical solution provided in this embodiment of the present disclosure, N first signal lines and a multiplexer are arranged on the first substrate, a first connection end of the first flexible circuit board is fixed to the first substrate, the multiplexer is electrically connected between the first connection end of the first flexible circuit board and the first signal lines; N second signal lines and a first demultiplexer are arranged on the second substrate, a second connection end of the first flexible circuit board is fixed to the second substrate, the first demultiplexer is electrically connected between the second connection end of the first flexible circuit board and the second signal lines; a number of electrical connection lines in the first flexible circuit board is M, where M is less than N, and both M and N are positive integers. Therefore, electrical connection between the first signal lines and the second signal lines may be implemented by arranging M connection pins on the first substrate and M connection pins on the second substrate. Because M is less than N, when the first substrate and the second substrate have a fixed size, compared with arranging N connection pins, arranging M connection pins makes it easier to design the connection pins to have a sufficiently large size, and the final bonding yield of flexible circuit board may be improved. In addition, because a technology of overlaying a plurality of layers of flexible circuit boards does not need to be used, a manufacturing cost of the display apparatus may also be reduced.

FIG. 1 is a schematic diagram of a structure of a display apparatus according to an embodiment of the present disclosure. It should be noted that, in FIG. 1, a plurality of types of signal lines are shown, for example, first signal lines 101, second signal lines 201, scan lines 102, scan lines 202, ground wires 104, ground wires 204, and timing control traces 105. These signal lines in FIG. 1 are different in thickness. This is because, when the display apparatus is actually fabricated, a metal film is sputtered on a substrate and then etched to form a metal pattern (that is, a pattern formed by the signal lines). In FIG. 1, signal lines with the same thickness are obtained by etching a metal film of the same layer, and signal lines with different thicknesses are obtained by etching metal films of different layers.

As shown in FIG. 1, the display apparatus includes: a first display module, a second display module, and a first flexible circuit board 30. The first display module includes a first substrate 10, with N first signal lines 101 and a multiplexer MUX arranged on the first substrate 10. A first connection end of the first flexible circuit board 30 is fixed to the first substrate 10, and the multiplexer MUX is electrically connected between the first connection end of the first flexible circuit board 30 and the first signal lines 101. The second display module includes a second substrate 20, with N second signal lines 201 and a first demultiplexer DEMUX1 arranged on the second substrate 20. A second connection end of the first flexible circuit board 30 is fixed to the second substrate 20, and the first demultiplexer DEMUX1 is electrically connected between the second connection end of the first flexible circuit board 30 and the second signal lines 201. A number of electrical connection lines in the first flexible circuit board 30 is M, M is less than N, and both M and N are positive integers.

In practice, in some embodiments, the first display module is configured to form a left-eye display screen of a head-mounted display device, and the second display module is configured to form a right-eye display screen of the head-mounted display device. Alternatively, the first display module is configured to form the right-eye display screen of the head-mounted display device, and the second display module is configured to form the left-eye display screen of the head-mounted display device.

In the present disclosure, the first display module and the second display module may specifically be a liquid crystal display (LCD) module, an organic light-emitting diode (OLED) display module, a Micro LED display module, a liquid crystal on silicon (LCOS) display module, or the like. For example, if the first display module and the second display module are liquid crystal display modules, then the first substrate and the second substrate are substrates for fabricating array substrates. If the first display module and the second display module are organic light-emitting display modules, then the first substrate and the second substrate are substrates for fabricating anodes, organic light-emitting layers, and cathodes.

A number of input ends of the multiplexer (also referred to as a data selector) is greater than a number of output ends. The multiplexer may output electrical signals received respectively from each of the input ends to the corresponding output end one by one at different time periods as needed. A number of input ends of the demultiplexer (also referred to as a data distributor or multi-distributor) is less than a number of output ends. The demultiplexer may output electrical signals received at the input ends to the corresponding output end one by one at different time periods as needed. A logic function of the demultiplexer is opposite to that of the multiplexer.

Persons of ordinary skill in the art may understand that if the multiplexer and the demultiplexer are not used, then N connection pins need to be arranged on the first substrate, and N connection pins need to be arranged on the second substrate, so as to implement electrical connection between the first signal lines and the second signal lines.

However, according to the technical solution provided in this application, because a number of input ends (in this application, the number of input ends of the multiplexer is equal to a number of the first signal lines, that is, N) is greater than a number of output ends (in this application, the number of output ends of the multiplexer is equal to a number of electrical connection lines in the first flexible circuit board, that is, M) of the multiplexer, and a number of input ends (in this application, the number of the input ends of the demultiplexer is equal to the number of the electrical connection lines in the first flexible circuit board, that is, M) is less than a number of the output ends (in this application, the number of the output ends of the demultiplexer is equal to the number of the second signal lines, that is, N) of the demultiplexer, only M connection pins need to be arranged on the first substrate, and M connection pins need to be arranged on the second substrate, so as to implement electrical connection between the first signal lines and the second signal lines. Because M is less than N, when the first substrate and the second substrate have a fixed size, apparently, arranging M connection pins makes it easier to design the connection pins to have a sufficiently large size, and the final bonding yield of the flexible circuit board may be improved. In addition, because a technology of overlaying a plurality of layers of flexible circuit boards does not need to be used, a manufacturing cost of the display apparatus may also be reduced.

In the foregoing technical solution, the first signal lines are configured to transmit a signal that can control pixel units in the first display module to display (or control light-emitting units to emit light). Similarly, the second signal lines are configured to transmit a signal that can control pixel units in the second display module to display (or control light-emitting units to emit light). The present disclosure does not limit specific signal lines represented by the first signal lines and the second signal lines.

In practice, as shown in FIG. 1, in order to reduce a voltage drop of scan lines (for example, the scan lines 102 and the scan lines 202), two gate circuits on array (GOAs) are arranged on each of the first substrate 10 and the second substrate 20. On the first substrate 10, the two GOA circuits are located on two sides of the scan lines 102. On the second substrate 20, the two GOA circuits are located on two sides of the scan lines 202. In different substrates, the GOA circuits located on the same side of the scan lines need to establish an electrical connection relationship through the flexible circuit board 30. Ground wires 104 are further arranged on the first substrate 10, ground wires 204 are further arranged on the second substrate 20, and the ground wires 104 and the ground wires 204 need to establish an electrical connection relationship through the flexible circuit board 30. Data lines are further arranged on the first substrate 10, data lines are further arranged on the second substrate 20, and the data lines on the two substrates need to establish an electrical connection relationship through the flexible circuit board 30.

Exemplarily, the first signal lines and the second signal lines include one or more of signal lines for electrically connecting the GOA circuits on the same side of the scan lines, the ground wires, and the data lines.

In some embodiments, both of the first signal lines and the second signal lines include data lines. Because, among all lines that may be considered as the first signal lines and the second signal lines, the data lines are the largest in number, the configuration that both of the first signal lines and the second signal lines include data lines can sufficiently reduce a number of connection pins that need to be fabricated to connect to the flexible circuit board.

Exemplarily, in FIG. 1, both of the first signal lines and the second signal lines are data lines.

Based on the foregoing technical solution, in some embodiments, the multiplexer includes at least one multiplexing unit, and the multiplexing unit includes P first input ends and one first output end; the first demultiplexer includes at least one first demultiplexing unit, and the first demultiplexing unit includes one second input end and P second output ends; P is an integer, and $1<P\leq N$; the multiplexing units are in one-to-one correspondence with the first demultiplexing units; and each of the first input ends in the multiplexing unit is in a one-to-one correspondence with the respective second output end in the corresponding first demultiplexing unit. A scan duration for each row of pixels includes P sub-scan periods; for each multiplexing unit, in each sub-scan period, only one first input end and a second output end corresponding to the first input end are electrically conducted; and the first input end that is in an electrically conducted state are different in different sub-scan periods.

Figure 2:
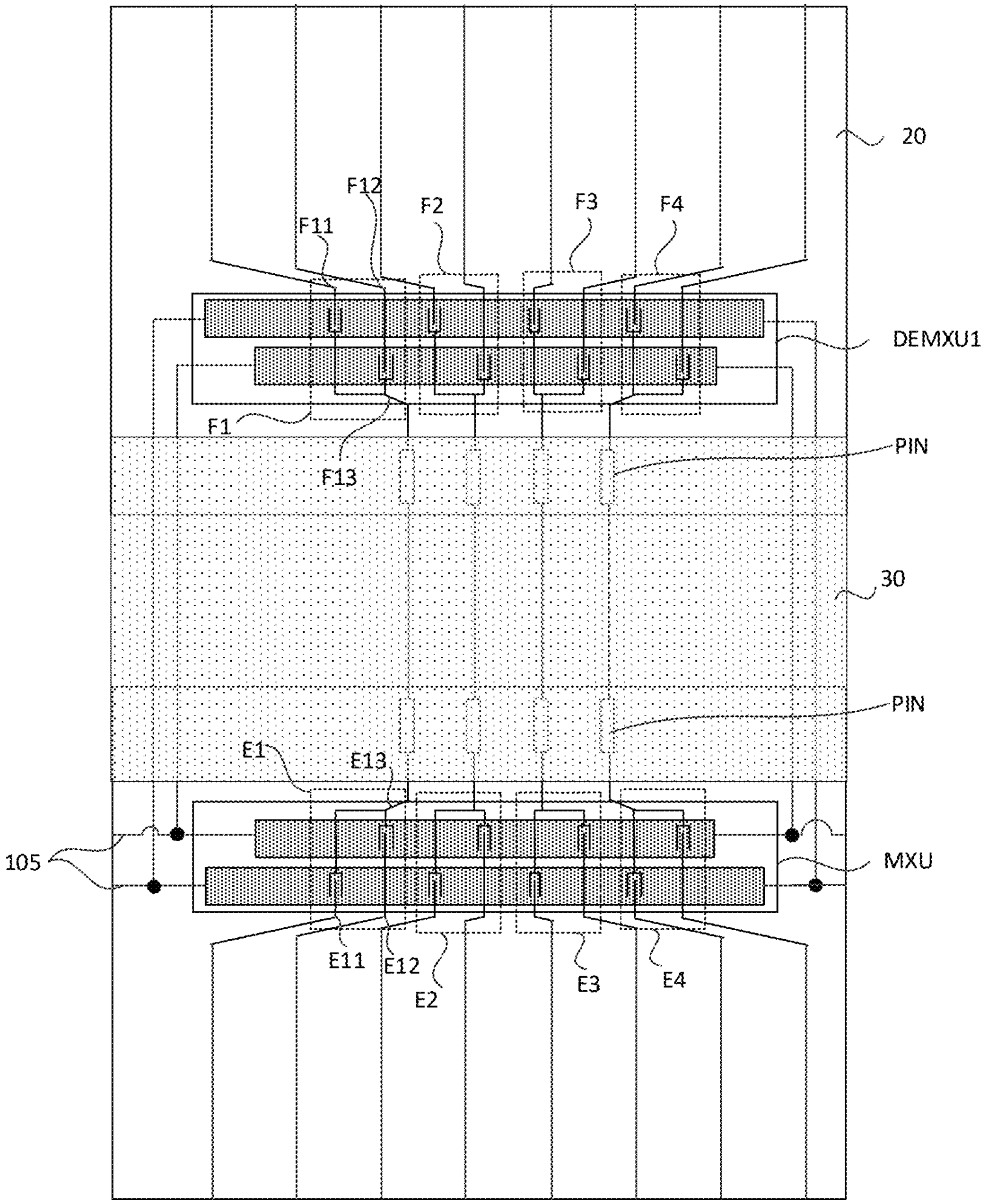
FIG. 2 is an enlarged view of a region A in FIG. 1.

FIG. 2 is an enlarged view of region A in FIG. 1. Exemplarily, as shown in FIG. 2, the multiplexer MUX includes four multiplexing units. The four multiplexing units are multiplexing unit E1, multiplexing unit E2, multiplexing unit E3, and multiplexing unit E4. The first demultiplexer DEMUX includes four first demultiplexing units. The four first demultiplexing units are first demultiplexing unit F1, first demultiplexing unit F2, first demultiplexing unit F3, and first demultiplexing unit F4, respectively. Each of the multiplexing units and each of the demultiplexing units include two thin film transistors (TFTs), respectively. In FIG. 2, "Π" represents a thin film transistor. The multiplexing unit E1 includes a first input end E11, a first input end E12, and a first output end E13. The first demultiplexing unit F1 includes a second input end F13, a second output end F11, and a second output end F12. The multiplexing unit E1 is in a one-to-one correspondence with the first demultiplexing unit F1. The first input end E11 in the multiplexing unit E1 corresponds to the second output end F11 in the first demultiplexing unit F1. The first input end E12 in the multiplexing unit E1 corresponds to the second output end F12 in the first demultiplexing unit F1. The scan duration for each row of pixels includes two sub-scan periods. In a first sub-scan period, the first input end E11 is electrically conducted with the second output end F11, and the first input end E12 is disconnected from the second output end F12. In a second sub-scan period, the first input end E11 is disconnected from the second output end F11, and the first input end E12 is electrically conducted with the second output end F12.

The multiplexing unit E2 is in a one-to-one correspondence with the first demultiplexing unit F2. The multiplexing unit E3 is in a one-to-one correspondence with the first demultiplexing unit F3. The multiplexing unit E4 is in a one-to-one correspondence with the first demultiplexing unit F4. These multiplexing units and their corresponding demultiplexing units are configured in a similar way to that of the multiplexing unit E1 and demultiplexing unit F1. Details are not described herein again.

In the foregoing solution, each multiplexing unit is equivalent to a single-pole multi-throw switch. By adjusting an operating state of the multiplexing unit, one of a plurality of input signals can be selected to be transmitted to the first output end as needed. Each first demultiplexing unit is also equivalent to a single-pole multi-throw switch. By adjusting an operating state of the first demultiplexing unit, one target second output end can be selected from a plurality of second output ends, and one input signal is transmitted to the target second output end, so that accurate transmission of a data signal is implemented, and it is ensured that each display module can properly display an image.

With continuous reference to FIG. 1, in some embodiments, the display apparatus further includes a driver chip IC and timing control traces 105; the driver chip IC is fixed on the first substrate 10, and the driver chip IC is electrically connected to the first signal lines 101; the driver chip IC is further electrically connected to both of the multiplexer MUX and the first demultiplexer DEMUX1 through the timing control traces 105, to control the first input end and its corresponding second output end to be electrically conducted. That is, the driver chip IC adjusts operating states of each of the multiplexing units MUX and the first demultiplexing units DEMUX1.

Based on each of the foregoing technical solutions, with continuous reference to FIG. 1, in some embodiments, the display apparatus further includes: a second demultiplexer DEMXU2; the second demultiplexer DEMXU2 is electrically connected between the driver chip IC and the first signal lines 101; and the driver chip IC is further electrically connected to the second demultiplexer DEMXU2 through the timing control traces 105.

In some embodiments, the second demultiplexer includes at least one second demultiplexing unit, and the second demultiplexing unit includes one third input end and P third output ends;

the multiplexing units are in a one-to-one correspondence with the second demultiplexing units; each of the first input ends in the multiplexing unit is in a one-to-one correspondence with each of the third output ends in the corresponding second demultiplexing unit; the first input end and the corresponding third output end are electrically connected to the same first signal line; the third input end is electrically connected to the driver chip; and for each second demultiplexing unit, in each sub-scan period, the third input end is only electrically conducted with one first input end, and the first input end that is in an electrically conducted state is electrically conducted with its corresponding second output end; and the first input end that is electrically conducted with the third input end is different in different sub-scan periods.

Figure 3:
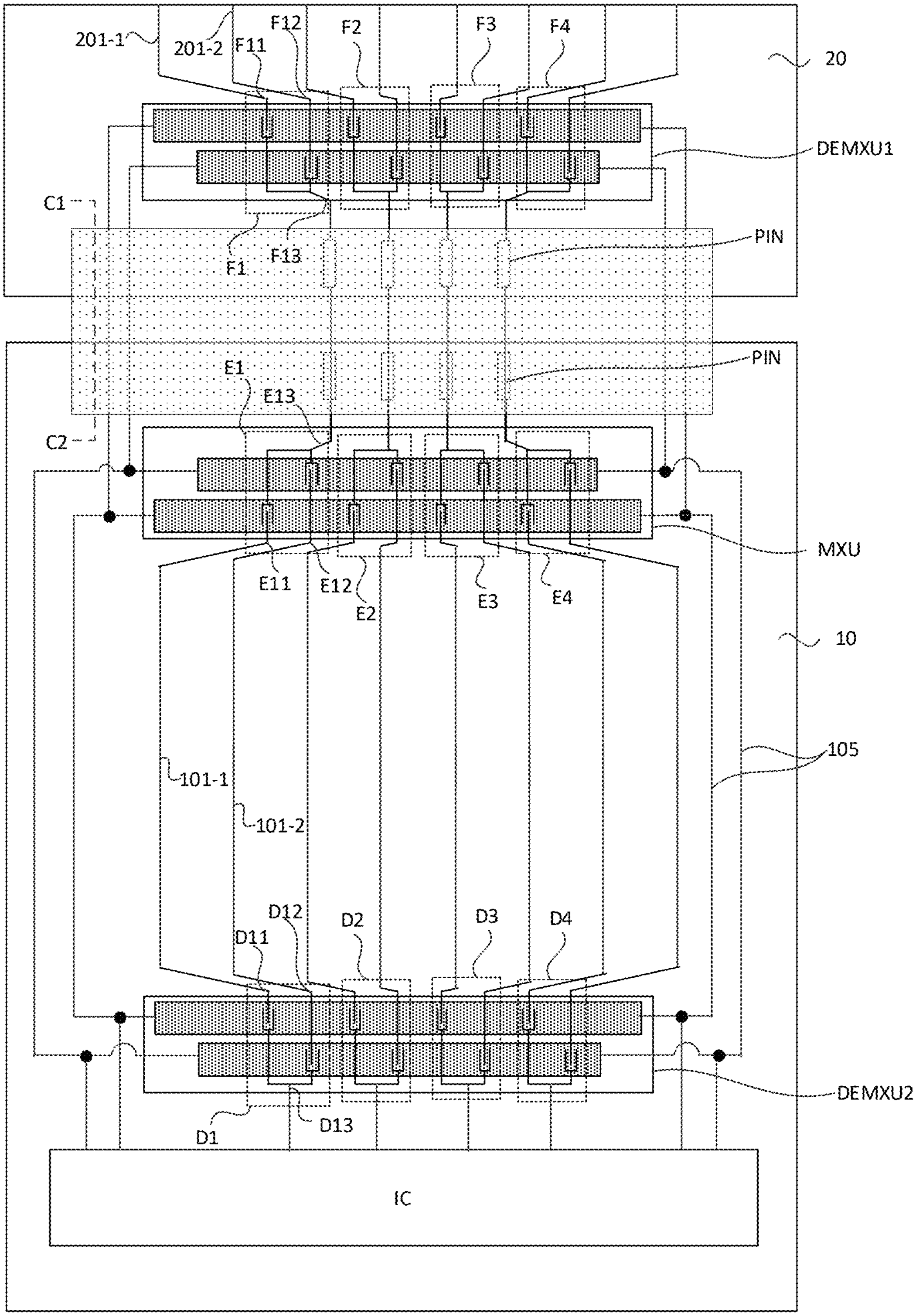
FIG. 3 is a schematic diagram of a partial structure of a display apparatus according to an embodiment of the present disclosure.

FIG. 3 is a schematic diagram of a partial structure of a display apparatus according to an embodiment of the present disclosure. Exemplarily, as shown in FIG. 3, in the display apparatus, the second demultiplexer DEMXU2 includes four second demultiplexing units, that is, a second demultiplexing unit D1, a second demultiplexing unit D2, a second demultiplexing unit D3, and a second demultiplexing unit D4. The second demultiplexing unit D1 includes a third input end D13, a third output end D11, and a third output end D12. The multiplexing unit E1 is in a one-to-one correspondence with the second demultiplexing unit D1. The first input end E11 in the multiplexing unit E1 corresponds to the third output end D11 in the second demultiplexing unit D1, and the two are electrically connected to a first signal line 101-1. The first input end E12 in the multiplexing unit E1 corresponds to the third output end D12 in the second demultiplexing unit D1, and the two are electrically connected to a first signal line 101-2. The third input end D13 in the second demultiplexing unit D1 is electrically connected to the driver chip IC.

The scan duration for each row of pixels includes two sub-scan periods. In a first sub-scan period, the third input end D13 is only electrically conducted with the first input end E11, and the first input end E11 that is in an electrically conducted state is electrically conducted with its corresponding second output end F11. A data signal output from the driver chip IC reaches a second signal line 201-1 through the third input end D13, the third output end D11, the first signal line 101-1, the first input end E11, the first output end E13, the second input end F13, and the second output end F11.

In a second sub-scan period, the third input end D13 is only electrically conducted with the first input end E12, and the first input end E12 that is in an electrically conducted state is electrically conducted with its corresponding second output end F12. A data signal output from the driver chip IC reaches a second signal line 201-2 through the third input end D13, the third output end D12, the first signal line 101-2, the first input end E12, the first output end E13, the second input end F13, and the second output end F12.

The second demultiplexing unit D2, the second demultiplexing unit D3, and the second demultiplexing unit D4 are configured in a similar way as the second demultiplexing unit D1. Details are not described herein again.

The foregoing technical solution can ensure that pixel units (or referred to as light-emitting units) in each display module can properly display an image.

Based on the foregoing technical solutions, in some embodiments, with continuous reference to FIG. 1, the first substrate 10 includes a first display region 11 and a first non-display region 12 surrounding the first display region 11; the second substrate 20 includes a second display region 21 and a second non-display region 22 surrounding the second display region 21. The first display module and the second display module are arranged side by side. The driver chip IC and the second demultiplexer DEMXU2 are located on a side of the first non-display region 12 away from the second display module, the multiplexer MUX is located on a side of the first non-display region 12 close to the second display module, and the first demultiplexer DEMXU1 is located on a side of the second non-display region 22 close to the first display module. This configuration can reduce a wiring difficulty of the first signal lines and the second signal lines.

Figure 4:
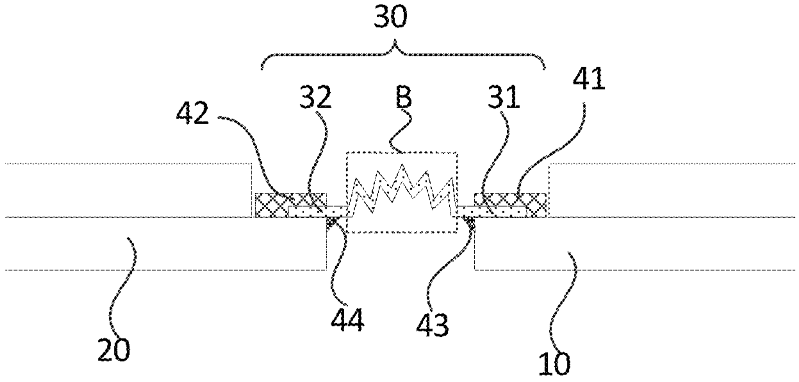
FIG. 4 is a cross-sectional view formed by cutting FIG. 3 along C1-C2.

FIG. 4 is a cross-sectional view formed by cutting FIG. 3 along C1-C2. In some embodiments, as shown in FIG. 4, the first flexible circuit board includes a bending region B; the bending region B is located between the first connection end 31 and the second connection end 32; a distance between the first display module and the second display module is adjustable; and a bending state of the bending region of the first flexible circuit board changes with the distance between the first display module and the second display module. In other words, if the distance between the first display module and the second display module is adjusted, only the bending region B of the first flexible circuit board 30 may be in the bending state, and the remaining parts cannot be bent and cannot be in the bending state. Such configuration makes it convenient to specially set the bending region B later, so that the bending region B can meet a requirement of withstanding a plurality of times of dynamic bending without damaging internal wires thereof, and at the same time, the remaining parts except the bending region B are reinforced to prevent the first connection end 31 and the second connection end 32 from warping during a bending process, resulting in poor conditions such as a short circuit or an open circuit.

A change in the bending state includes a change in a bending shape; or a bending shape is the same, but a bending degree changes.

Figure 5:
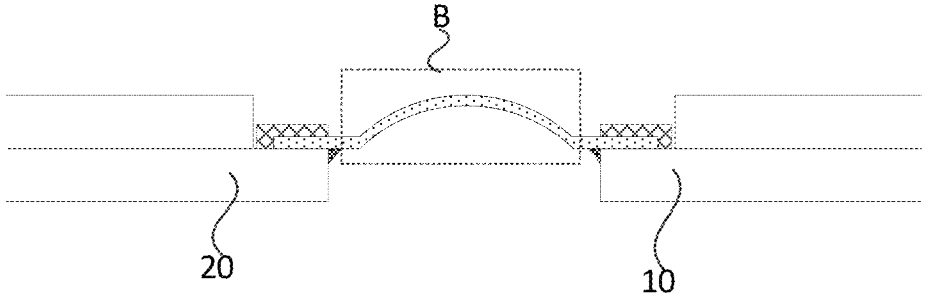
FIG. 5 and FIG. 6 are schematic diagrams of cross-sectional structures of two other display apparatuses according to embodiments of the present disclosure.
Figure 6:
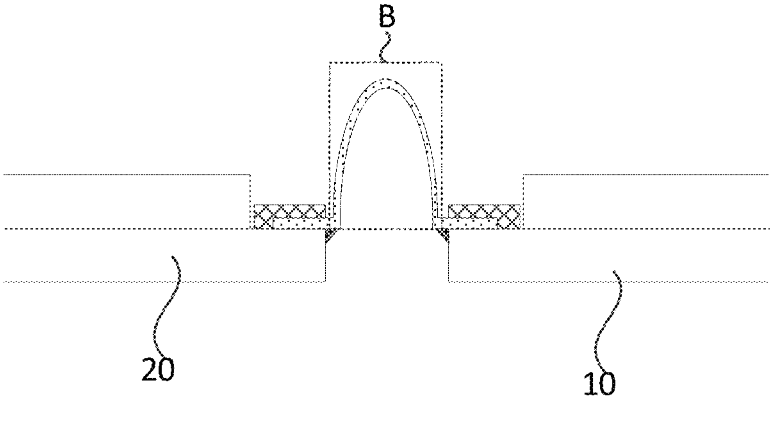

In practice, there are a plurality of bending shapes that may be presented by the bending region of the first flexible circuit board, which are not limited in this application. For example, with reference to FIG. 4, a bending shape of the bending region B of the first flexible circuit board 30 is a zigzag shape. FIG. 5 and FIG. 6 are schematic diagrams of cross-sectional structures of two other display apparatuses according to embodiments of the present disclosure. FIG. 5 corresponds to a case where a distance between the first display module and the second display module is relatively large. FIG. 6 corresponds to a case where a distance between the first display module and the second display module is relatively small. With reference to FIG. 5 and FIG. 6, a bending shape of the bending region B of the first flexible circuit board 30 is an arched shape. The distance between the first display module and the second display module is different, and arched curvature radius presented by the bending region of the first flexible circuit board is different.

With continuous reference to FIG. 4, in some embodiments, a first reinforcing layer 41 is arranged on a side of a first connection end 31 of the first flexible circuit board 30 away from the first substrate 10; and a second reinforcing layer 42 is arranged on a side of a second connection end 32 of the first flexible circuit board 30 away from the second substrate 20. The first reinforcing layer 41 can increase an anti-bending degree of the first connection end 31, reducing a probability of poor conditions such as a short circuit or an open circuit caused by warping of the first connection end 31. The second reinforcing layer 42 can increase an anti-bending degree of the second connection end 32, reducing a probability of poor conditions such as a short circuit or an open circuit caused by warping of the second connection end 32.

Because the first connection end 31 and the second connection end 32 form "gold finger" for electrical connection, and a material of the "gold finger" is metal and is prone to water and oxygen erosion. In this regard, with continuous reference to FIG. 4, in some embodiments, the first reinforcing layer 41 covers an end of the first connection end 31 and is in contact with the first substrate 10; and/or the second reinforcing layer 42 covers an end of the second connection end 32 and is in contact with the second substrate 20. In this way, the ends of the first connection end 31 and the second connection end 32 can be sealed, to reduce a probability of water and oxygen erosion of the first connection end 31 and the second connection end 32. In some embodiments, the first reinforcing layer 41 and the second reinforcing layer 42 are made of a material resistant to water and oxygen.

With continuous reference to FIG. 4, in some embodiments, a third reinforcing structure 43 is arranged on a side of the first connection end 31 of the first flexible circuit board 30 close to the first substrate 10, the third reinforcing structure 43 is located in a step region formed by the first flexible circuit board 30 and the first substrate 10, and is fixed to a surface of the first connection end 31 of the first flexible circuit board 30 close to the first substrate 10 and a sidewall of the first substrate 10; and/or a fourth reinforcing structure 44 is arranged on a side of the second connection end 32 of the first flexible circuit board 30 close to the second substrate 20, the fourth reinforcing structure 44 is located in a step region formed by the first flexible circuit board 30 and the second substrate 20, and is fixed to a surface of the second connection end 32 of the first flexible circuit board 30 close to the second substrate 20 and a sidewall of the second substrate 20. A function of the third reinforcing structure 43 is to reduce a probability of poor conditions such as a short circuit or an open circuit caused by warping of the first connection end 31. A function of the fourth reinforcing structure 44 is to increase an anti-bending degree of the second connection end 32, and reduce a probability of poor conditions such as a short circuit or an open circuit caused by warping of the second connection end 32.

Figure 7:
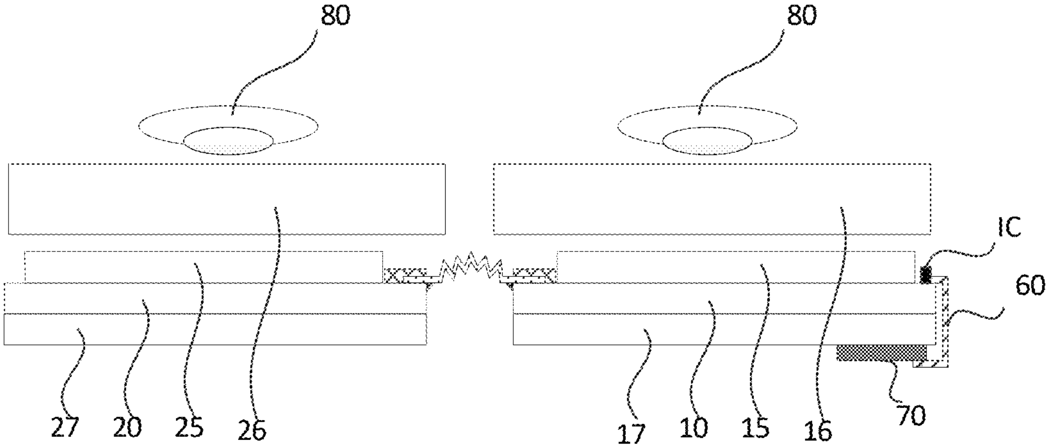
FIG. 7 is a schematic diagram of a cross-sectional structure of another display apparatus according to an embodiment of the present disclosure.

Further, FIG. 7 is a schematic diagram of a cross-sectional structure of another display apparatus according to an embodiment of the present disclosure. With reference to FIG. 7, the display apparatus further includes a second flexible circuit board 60 and a printed circuit board 70; the driver chip IC is electrically connected to the printed circuit board 70 through the second flexible circuit board 60; and the printed circuit board 70 is located on a non-light-emitting side of the first display module. The printed circuit board 70 is a main board of the display apparatus. This setting can narrow a frame of the display apparatus, which is consistent with a development trend of a narrow frame.

With continuous reference to FIG. 7, if the display apparatus is a liquid crystal display apparatus, both of the first substrate 10 and the second substrate 20 are substrates for forming array substrates. The first display module further includes a color filter substrate 15 opposite to the first substrate 10. The display apparatus further includes a backlight module 17 and a lens group 16. The backlight module 17 is located on a side of the first substrate 10 away from the color filter substrate 15. The lens group 16 is located on a side of the color filter substrate 15 away from the first substrate 10. The second display module further includes a color filter substrate 25 opposite to the second substrate 20. The display apparatus further includes a backlight module 27 and a lens group 26. The backlight module 27 is located on a side of the second substrate 20 away from the color filter substrate 25. The lens group 26 is located on a side of the color filter substrate 25 away from the second substrate 20. The printed circuit board 70 is located on a side of the backlight module 17 away from the display module. A human eye 80 views the display module through the lens group 26 and the lens group 16. The lens group 26 and the lens group 16 are configured to magnify images displayed in display modules respectively corresponding to the lens group 26 and the lens group 16. In some embodiments, the lens group 26 and the lens group 16 include one or more of an aspheric lens, an aspheric Fresnel lens, a spherical lens, and a mirror.

Based on the foregoing technical solutions, in some embodiments, the first display module and the second display module are both in a shape of a convex polygon. The convex polygon refers to a polygon in which, when any side of all sides of the polygon is infinitely extended in two directions to form a straight line, other sides are on a same side of the straight line. The purpose of this setting is to ensure that a display module in a required shape can be formed through a simple cutting process, without using a notch making technology, so that a manufacturing difficulty and a process cost of the display apparatus can be reduced.

Figure 8:
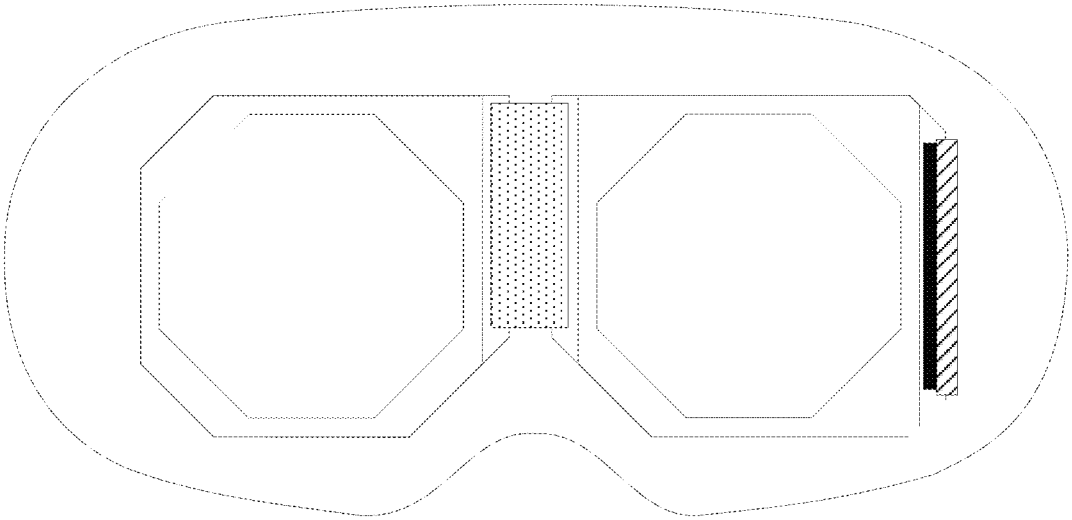
FIG. 8 is a schematic diagram of a structure of an extended reality device according to an embodiment of the present disclosure.

An embodiment of the present disclosure further provides an extended reality device. FIG. 8 is a schematic diagram of a structure of an extended reality device according to an embodiment of the present disclosure. As shown in FIG. 8, the extended reality device includes the display apparatus according to any one of the embodiments of the present disclosure.

The extended reality device refers to a terminal that implements combining the real world with the virtual world, and may usually be provided in the form of glasses, a head-mounted display (Head Mount Display, HMD), or contact lenses, to implement visual perception and other forms of perception. Certainly, the form implemented by the virtual reality device is not limited thereto, and may be further miniaturized or enlarged as needed. The extended reality device includes but is not limited to a virtual reality device and an augmented reality device.

Because the extended reality device provided in this embodiment of the present disclosure includes the display apparatus according to any one of the embodiments of the present disclosure, the extended reality device has the same or corresponding beneficial effects as the display apparatus included in the extended reality device.

It should be noted that, in this specification, relationship terms such as "first" and "second" are merely used to distinguish one entity or operation from another entity or operation, but do not necessarily require or imply any actual relationship or order between these entities or operations. Moreover, the terms "include", "including", or any other variant thereof are intended to cover non-exclusive inclusion, so that a process, method, article, or device that includes a series of elements includes not only those elements, but also other elements not explicitly listed, or elements inherent to the process, method, article, or device. Without more restrictions, an element defined by the statement "include a/an . . . " does not exclude the existence of another identical element in the process, method, article, or device including the element.

The foregoing descriptions are merely specific implementations of the present disclosure, which facilitates a person skilled in the art to understand or implement the present disclosure. Multiple variations of these embodiments are obvious to a person skilled in the art, and the general principal defined herein can be implemented in other embodiments without departure from spirit or scope of the present disclosure. Thus, the present disclosure is not limited to these embodiments set forth herein, but is to be in accordance with the broadest scope consistent with the principal and novelty as disclosed herein.

The invention claimed is:

1. A display apparatus, comprising:

a first display module, comprising a first substrate, wherein N first signal lines and a multiplexer are arranged on the first substrate;

a second display module, comprising a second substrate, wherein N second signal lines and a first demultiplexer are arranged on the second substrate; and a first flexible circuit board, wherein a first connection end of the first flexible circuit board is fixed to the first substrate, the multiplexer is electrically connected between the first connection end of the first flexible circuit board and the first signal lines; a second connection end of the first flexible circuit board is fixed to the second substrate, and the first demultiplexer is electrically connected between the second connection end of the first flexible circuit board and the second signal lines, wherein a number of electrical connection lines in the first flexible circuit board is M, M is less than N, and both of M and N are positive integers, and wherein the display apparatus further comprises at least one of the following:

a third reinforcing structure, arranged on a side of the first connection end of the first flexible circuit board close to the first substrate, wherein the third reinforcing structure is located in a step region formed by the first flexible circuit board and the first substrate, and is fixed to a surface of the first connection end of the first flexible circuit board close to the first substrate and a sidewall of the first substrate; or a fourth reinforcing structure, arranged on a side of the second connection end of the first flexible circuit board close to the second substrate, wherein the fourth reinforcing structure is located in a step region formed by the first flexible circuit board and the second substrate, and is fixed to a surface of the second connection end of the first flexible circuit board close to the second substrate and a sidewall of the second substrate.

2. The display apparatus according to claim 1, wherein both of the first signal lines and the second signal lines comprise data lines.

3. The display apparatus according to claim 1, wherein the multiplexer comprises at least one multiplexing unit, and the multiplexing unit comprises P first input ends and one first output end; the first demultiplexer comprises at least one first demultiplexing unit, and the first demultiplexing unit comprises one second input end and P second output ends; P is an integer, and $1<P\leq N$; the multiplexing units are in one-to-one correspondence with the first demultiplexing units; and each of the first input ends in the multiplexing unit is in one-to-one correspondence with each of the second output ends in the corresponding first demultiplexing unit;

a scan duration for each row of pixels comprises P sub-scan periods; for each of the multiplexing units, in each of the sub-scan periods, only one of the first input ends and its corresponding second output end are electrically conducted; and the first input end that is in an electrically conducted state is different in different sub-scan periods.

4. The display apparatus according to claim 3, further comprising a driver chip and timing control traces;

wherein the driver chip is fixed on the first substrate, and the driver chip is electrically connected to the first signal lines; the driver chip is further electrically connected to the multiplexer and the first demultiplexer through the timing control traces, to control the first input end and its corresponding second output end to be electrically conducted.

5. The display apparatus according to claim 4, further comprising a second demultiplexer, wherein the second demultiplexer is electrically connected between the driver chip and the first signal lines; the driver chip is further electrically connected to the second demultiplexer through the timing control traces.

6. The display apparatus according to claim 5, wherein the second demultiplexer comprises at least one second demultiplexing unit, and the second demultiplexing unit comprises one third input end and P third output ends;

the multiplexing units are in one-to-one correspondence with the second demultiplexing units; each of the first input ends in the multiplexing unit is in one-to-one correspondence with each of the third output ends in the corresponding second demultiplexing unit; the first input end and its corresponding third output end are electrically connected to the same first signal line; the third input end is electrically connected to the driver chip;

in each of the sub-scan periods, for each of the second demultiplexing units, the third input end is electrically conducted with only one of the first input ends, and the first input end that is in an electrically conducted state is electrically conducted with its corresponding second output end; and the first input end that is electrically conducted with the third input end is different in different sub-scan periods.

7. The display apparatus according to claim 5, wherein the first substrate comprises a first display region and a first non-display region surrounding the first display region; the second substrate comprises a second display region and a second non-display region surrounding the second display region;

the first display module and the second display module are arranged side by side;

the driver chip and the second demultiplexer are located on a side of the first non-display region away from the second display module, the multiplexer is located on a side of the first non-display region close to the second display module, the first demultiplexer is located on a side of the second non-display region close to the first display module.

8. The display apparatus according to claim 4, further comprising a second flexible circuit board and a printed circuit board;

wherein the driver chip is electrically connected to the printed circuit board through the second flexible circuit board;

the printed circuit board is located on a non-light-emitting side of the first display module.

9. The display apparatus according to claim 1, wherein the first flexible circuit board comprises a bending region;

a distance between the first display module and the second display module is adjustable;

and a bending state of the bending region of the first flexible circuit board changes with the distance between the first display module and the second display module.

10. The display apparatus according to claim 1, wherein a first reinforcing layer is arranged on a side of the first connection end of the first flexible circuit board away from the first substrate; and a second reinforcing layer is arranged on a side of the second connection end of the first flexible circuit board away from the second substrate.

11. The display apparatus according to claim 10, further comprising at least one of the following:

the first reinforcing layer covers an end of the first connection end and is in contact with the first substrate; and the second reinforcing layer covers an end of the second connection end and is in contact with the second substrate.

12. The display apparatus according to claim 1, wherein the first display module and the second display module are both in a shape of a convex polygon.

13. An extended reality device, comprising a display apparatus comprising:

a first display module, comprising a first substrate, wherein N first signal lines and a multiplexer are arranged on the first substrate;

a second display module, comprising a second substrate, wherein N second signal lines and a first demultiplexer are arranged on the second substrate; and a first flexible circuit board, wherein a first connection end of the first flexible circuit board is fixed to the first substrate, the multiplexer is electrically connected between the first connection end of the first flexible circuit board and the first signal lines; a second connection end of the first flexible circuit board is fixed to the second substrate, and the first demultiplexer is electrically connected between the second connection end of the first flexible circuit board and the second signal lines, wherein a number of electrical connection lines in the first flexible circuit board is M, M is less than N, and both of M and N are positive integers, and wherein the display apparatus further comprises at least one of the following:

a third reinforcing structure, arranged on a side of the first connection end of the first flexible circuit board close to the first substrate, wherein the third reinforcing structure is located in a step region formed by the first flexible circuit board and the first substrate, and is fixed to a surface of the first connection end of the first flexible circuit board close to the first substrate and a sidewall of the first substrate; or a fourth reinforcing structure, arranged on a side of the second connection end of the first flexible circuit board close to the second substrate, wherein the fourth reinforcing structure is located in a step region formed by the first flexible circuit board and the second substrate, and is fixed to a surface of the second connection end of the first flexible circuit board close to the second substrate and a sidewall of the second substrate.

14. The display apparatus according to claim 13, wherein both of the first signal lines and the second signal lines comprise data lines.

15. The extended reality device according to claim 13, wherein the multiplexer comprises at least one multiplexing unit, and the multiplexing unit comprises P first input ends and one first output end; the first demultiplexer comprises at least one first demultiplexing unit, and the first demultiplexing unit comprises one second input end and P second output ends; P is an integer, and $1<P\leq N$; the multiplexing units are in one-to-one correspondence with the first demultiplexing units; and each of the first input ends in the multiplexing unit is in one-to-one correspondence with each of the second output ends in the corresponding first demultiplexing unit;

a scan duration for each row of pixels comprises P sub-scan periods; for each of the multiplexing units, in each of the sub-scan periods, only one of the first input ends and its corresponding second output end are electrically conducted; and the first input end that is in an electrically conducted state is different in different sub-scan periods.

16. The extended reality device according to claim 15, wherein the display apparatus further comprises a driver chip and timing control traces;

wherein the driver chip is fixed on the first substrate, and the driver chip is electrically connected to the first signal lines; the driver chip is further electrically connected to the multiplexer and the first demultiplexer through the timing control traces, to control the first input end and its corresponding second output end to be electrically conducted.

17. The extended reality device according to claim 16, wherein the display apparatus further comprises a second demultiplexer, wherein the second demultiplexer is electrically connected between the driver chip and the first signal lines; the driver chip is further electrically connected to the second demultiplexer through the timing control traces.

18. The extended reality device according to claim 17, wherein the second demultiplexer comprises at least one second demultiplexing unit, and the second demultiplexing unit comprises one third input end and P third output ends;

the multiplexing units are in one-to-one correspondence with the second demultiplexing units; each of the first input ends in the multiplexing unit is in one-to-one correspondence with each of the third output ends in the corresponding second demultiplexing unit; the first input end and its corresponding third output end are electrically connected to the same first signal line; the third input end is electrically connected to the driver chip;

in each of the sub-scan periods, for each of the second demultiplexing units, the third input end is electrically conducted with only one of the first input ends, and the first input end that is in an electrically conducted state is electrically conducted with its corresponding second output end; and the first input end that is electrically conducted with the third input end is different in different sub-scan periods.

19. The extended reality device according to claim 17, wherein the first substrate comprises a first display region and a first non-display region surrounding the first display region; the second substrate comprises a second display region and a second non-display region surrounding the second display region;

the first display module and the second display module are arranged side by side;

the driver chip and the second demultiplexer are located on a side of the first non-display region away from the second display module, the multiplexer is located on a side of the first non-display region close to the second display module, the first demultiplexer is located on a side of the second non-display region close to the first display module.

* * * * *